Feb. 10, 1970   W. A. NEMETH   3,494,582
SIDE MOUNTED INSULATOR SUPPORTING BRACKET
Filed Jan. 5, 1968
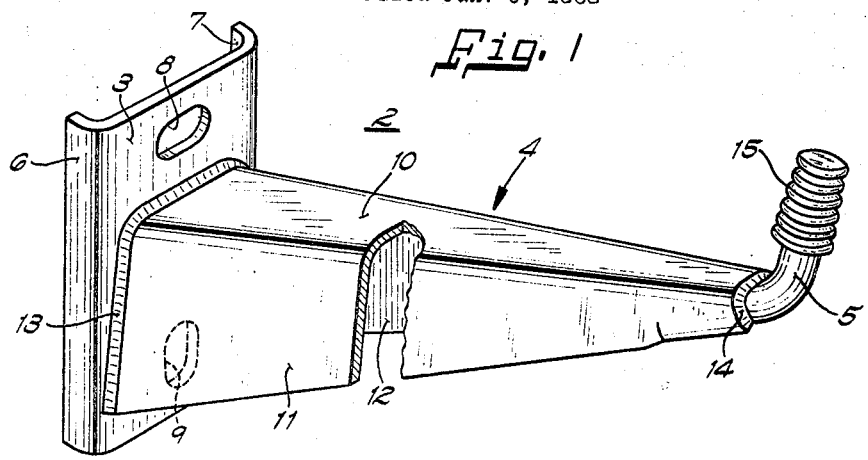
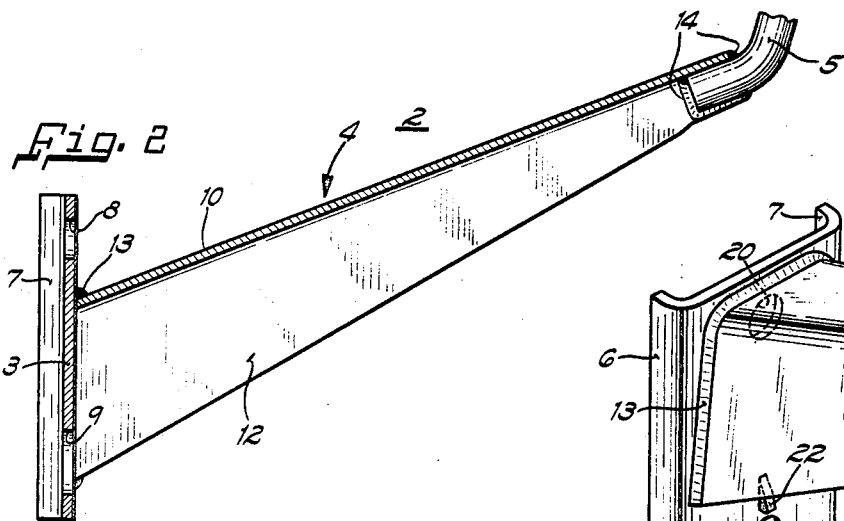
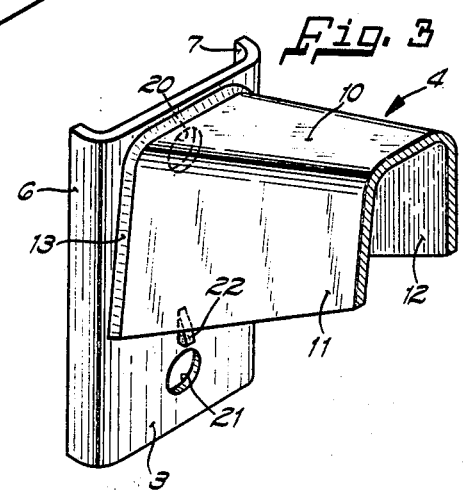
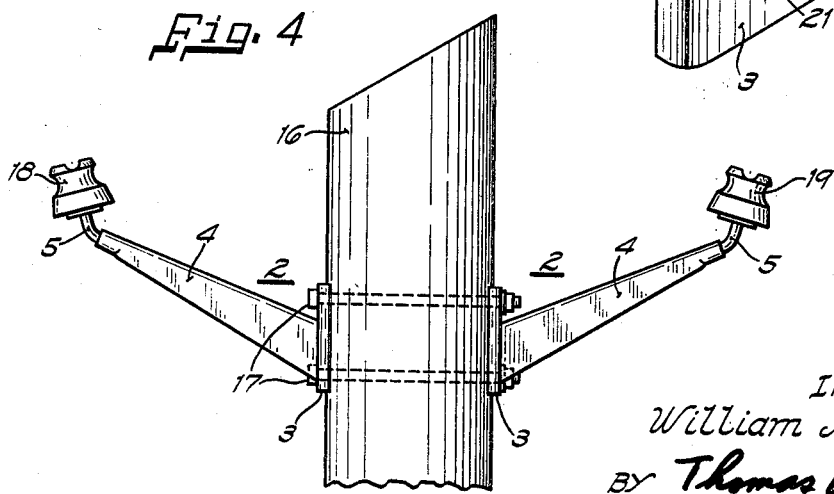
INVENTOR.
William A. Nemeth
BY Thomas E. Torphy
Attorney United States Patent Office 3,494,582
Patented Feb. 10, 1970

3,494,582
SIDE MOUNTED INSULATOR SUPPORTING BRACKET
William A. Nemeth, Stewartsville, N.J., assignor to McGraw-Edison Company, Milwaukee, Wis., a corporation of Delaware
Filed Jan. 5, 1968, Ser. No. 696,004
Int. Cl. F16m *13/02;* H01b *17/16*
U.S. Cl. 248—221           5 Claims

ABSTRACT OF THE DISCLOSURE

A unitary, all welded cantilever insulator supporting bracket suitable for use in supporting power lines in a generally horizontal position outward from a supporting structure such as an upright pole. The bracket includes a base plate, an arm tapered from its base to its outward end, and an insulator mounting pin at the outward end of the arm.

BACKGROUND OF THE INVENTION

This invention relates to power line insulator supporting brackets and, more particularly, to cantilever supporting brackets suitable for supporting power lines in a generally horizontal position outward from a supporting structure such as an upright pole.

In the construction and erecting of power line systems, one problem has been to provide a rigid support for power lines strung in a generally horizontal tangent to the supporting structure as well as a means of supporting power lines which turn at an angle from the tangent of the line position to the supporting structure. Another problem has been to provide a unitary and sufficiently rigid support specifically designed for attachment directly to the sides of the supporting structure, such as a pole. It is also desirable to provide for various mounting arrangements, such as back-to-back or staggered.

SUMMARY OF THE INVENTION

It is an object of this invention to provide an insulator supporting cantilever bracket of maximum strength and rigidity in both horizontal and vertical directions while keeping the weight of the device at a minimum.

It is another object to provide a bracket of the aforedescribed type which has an attractive appearance.

It is a more specific object to provide such a bracket which is of a unitary, all welded construction which can be formed and assembled at minimum cost.

These objects are accomplished by providing an insulator supporting bracket comprising a base plate adapted for being fastened to a vertical support, an arm fastened at its base end to the base plate and extending horizontally from the base plate, and an insulator supporting pin fastened to the other end of the arm. The arm has an inverted U-shaped cross section and is uniformly tapered from one end to the other, the large end being the base end and the smaller end being the pin end. The top and two side portions of the arm are each tapered from the base end to the tip end.

In a cantilever support the maximum bending stresses occur at the base or fastened end of the arm and decrease as the distance from the base end increases. The shape of the arm in the invention, therefore, provides maximum strength with minimum weight and cost, as well as an attractive appearance.

The all welded construction contributes to the strength and durability of the device.

BRIEF DESCRIPTION OF THE DRAWINGS

FIG. 1 is an isometric and partially broken away view of a bracket embodying the invention;

FIG. 2 is a partially sectional view of the device shown in FIG. 1;

FIG. 3 is a fragmentary view of a modification of the device shown in FIG. 1 and FIG. 2; and FIG. 4 is a front elevational view of a pair of devices, such as shown in FIG. 1, mounted back-to-back on opposite sides of a vertical support.

DESCRIPTION OF THE PREFERRED EMBODIMENTS

Referring to the drawings, there is shown an insulator supporting bracket 2 comprising a base plate 3, an arm 4 and an insulator supporting pin 5.

Base plate 3 is preferably made of sheet steel. The lateral edges 6 and 7 of plate 3 are bent rearwardly so that plate 3 may be more rigidly secured to a round supporting pole. A horizontally elongated mounting hole 8 and a vertically elongated mounting hole 9 are formed in plate 3. The elongation of these holes facilitates the back-to-back mounting of two similar brackets.

Arm 4 is also preferably formed of sheet steel. Arm 4 is a tapered channel-like member having an inverted U-shaped cross section. Arm 4 has three substantially planar portions, a top portion 10 and two depending side portions 11 and 12 depending from the sides of top portion 10. Each of portions 10, 11 and 12 is tapered from the larger base end abutting plate 3 to the smaller opposite or tip end.

The base end of arm 2 is formed at an angle so that arm 4 extends at an angle above the horizontal. A weld 13 fastens the base end of arm 4 to plate 3.

The insulator supporting pin 5 fastened to the outer end of arm 4 is made of steel rod and is bent upwardly beyond the end of arm 4. The upward bend facilitates cornering of the power line in that the supported line can more easily change direction at a more vertical insulator. The inner end of pin 5 extends within the end of arm 4, and the lower outer edges of sides 11 and 12 are crimped about pin 5 so that the inner surface of arm 4 conforms more closely to the shape of the inner end of pin 5. Pin 5 is fastened to arm 4 by a weld 14 laid continuously along the edges of the juxtaposed areas of arm 4 and pin 5. A conventional threaded lead tip 15 is cast on the end of pin 5 to provide means for attaching a threaded insulator.

FIG. 4 illustrates two insulator supporting brackets 2 mounted back-to-back on opposite sides of a pole 16 by means of a pair of bolts 17 which extend through mounting holes 8 and 9 and horizontally through pole 16. The vertical elongation of holes 9 accommodates any vertical misalignment of bolts 17 while the horizontal elongation of holes 8 accommodates horizontal misalignment. Two conventional insulators 18 and 19 are shown threaded onto the lead tips of brackets 2.

FIG. 3 illustrates a modification of the device. Base plate 3 has two circular mounting holes 20 and 21. The base end of arm 4 is placed higher on base plate 3 with the inner edge of portion 10 closely adjacent hole 20 to hold the edge of the head of the inserted bolt 17 (FIG. 4) against turning and thereby facilitate the mounting of the device. In addition, there is furnished a nib 22 formed on base 3 adjacent hole 21 to hold the head of the other of bolts 17 against turning when the device is being mounted. Neither of the bolt heads need therefore be held during tightening of the bolts.

While the devices heretofore described are adapted to fulfill the objects stated, it is to be understood that it is not intended that the invention be confined to the particular embodiments disclosed.

I claim:

1. A unitary one-piece all welded insulator supporting bracket comprising:
   a base plate for being attached to the side of an upright support;
   a straight topped and straight sided channel-shaped horizontally extending arm having a base end and an opposite pin end and an inverted U-shaped cross section, and base end being welded to said base plate;
   an insulator supporting pin made of steel rod having one end inserted within and welded to the inverted substantially U-shaped pin end of said arm, said pin is bent upwardly beyond said pin end of said arm to form a portion more vertical than said arm upon which portion a power line insulator may be mounted to thereby facilitate cornering of a power line; and
   means secured to the end of said pin for fastening an insulator to said pin.

2. A unitary one-piece all welded insulator supporting bracket comprising:
   a base plate for being attached to the side of an upright support;
   a straight topped and straight sided channel-shaped horizontally extending arm having a base end and an opposite pin end and an inverted U-shaped cross section, said base end being welded to said base plate;
   an insulator supporting pin made of steel rod having one end inserted within and welded to the inverted substantially U-shaped pin end of said arm, said pin is bent upwardly beyond said pin end of said arm to form a portion more vertical than said arm upon which portion a power line insulator may be mounted; and
   means secured to the end of said pin for fastening an insulator to said pin.

3. A integral insulator supporting bracket for an electrical line comprising:
   a base plate for attachment to an upright support;
   a channel-shaped arm extending in a horizontal direction having a base end and an apposite pin end, said base end being integrally joined to said base plate;
   an insulator supporting pin having one end inserted within and integrally joined to the substantially rounded pin end of said arm; said insulator supporting pin is bent upwardly beyond said pin end of said arm to form a portion more vertical than said arm upon which portion an electrical line insulator may be mounted; and
   means secured to said pin for fastening said electrical line insulator to said pin.

4. An integral insulator supporting bracket for an electrical line comprising:
   a base plate for attachment to an upright support, said base plate having at least one aperture in said base plate for accommodating a mounting bolt, and a nib formed on said base plate adjacent said aperture for holding the head of said bolt against turning;
   an arm extending in a horizontal direction having a base end and an opposite pin end, said base end being integrally joined to said base plate;
   an insulator supporting pin having one end inserted within and integrally joined to the substantially U-shaped pin end of said arm, said insulator support-pin is bent upwardly beyond said pin end of said arm to form a portion more vertical than said arm upon which portion an electrical line insulator may be mounted; and
   means secured to said pin for fastening said electrical line insulator to said pin.

5. An integral insulator supporting bracket for an electrical line comprising:
   a base plate for attachment to an upright support, said base plate having two mounting apertures in said base plate, one elongated vertically and the other elongated horizontally to facilitate mounting said bracket with another similar bracket on opposite sides of said upright support;
   an arm extending in a horizontal direction having a base end and an opposite pin end, said base end being integrally joined to said base plate;
   an insulator supporting pin having one end inserted within and integrally joined to the substantially U-shaped pin end of said arm, said insulator support-pin is bent upwardly beyond said pin end of said arm to form a portion more vertical than said arm upon which portion an electrical line insulator may be mounted; and
   means secured to said pin for fastening said electrical line insulator to said pin.

References Cited

UNITED STATES PATENTS

| | | | |
|---|---|---|---|
| 740,005 | 9/1903 | Gilliland | 248—221 |
| 1,139,950 | 5/1915 | Bowdle | 248—221 |
| 1,166,928 | 1/1916 | Peirce | 248—221 |
| 1,812,203 | 6/1931 | Gaskill | 248—221 |
| 2,018,532 | 10/1935 | Pittman | 174—158.2 |
| 3,129,917 | 4/1964 | Huggins | 248—221 |
| 1,897,385 | 2/1933 | Fassinger | 248—67.7 |
| 3,065,945 | 11/1962 | Newsome | 248—230 X |

ROY D. FRAZIER, Primary Examiner

J. FRANKLIN FOSS, Assistant Examiner

U.S. Cl. X.R.

174—158